Sept. 1, 1953          H. D. HUME          2,650,690

TRAILER TYPE CROP LOADER

Filed Dec. 13, 1950          7 Sheets-Sheet 1

INVENTOR.
Horace D. Hume
BY
Struhl Wells.
Atty.

Sept. 1, 1953  H. D. HUME  2,650,690
TRAILER TYPE CROP LOADER

Filed Dec. 13, 1950  7 Sheets-Sheet 5

INVENTOR.
Horace D. Hume
BY
Snell Wells
Atty.

Patented Sept. 1, 1953

2,650,690

UNITED STATES PATENT OFFICE 2,650,690

TRAILER TYPE CROP LOADER

Horace D. Hume, Mendota, Ill.

Application December 13, 1950, Serial No. 200,578

3 Claims. (Cl. 198—9)

The present invention relates to improvements in a trailer type crop loader.

It is the purpose of the present invention to provide a novel loading machine, adapted to be towed by a truck or similar towing and crop hauling vehicle, the loading machine having means to pick up the crop from a windrow or swath, elevate the crop and carry the crop forward into the truck body. This machine is particularly adapted to handle hay and vine crops. It is so constructed that a hauling vehicle can be attached to it and pull it along until the hauling vehicle is loaded, then another hauling vehicle can replace the first hauling vehicle until it is loaded. The hauling vehicles furnish the motive power and the loader can be operated without the use of a tractor or separate power unit and driver.

It is also a purpose of this invention to provide a trailer type crop loader embodying a lower pick up unit and an elevating conveyor that extends upwardly and rearwardly from the pick up unit, the pick up unit and conveyor pivoting about a point at the rear end of the conveyor and being spring counterbalanced to follow the ground contour, together with a second pick up unit and a conveyor, extending forwardly and upwardly therefrom, the second pick up unit and conveyor being directly over the lower conveyor and pivotally mounted adjacent the rear end of the lower conveyor and spring balanced so that the forward end of the upper conveyor is readily raised and lowered, and a deflecting apron on the rear end of the lower conveyor operable to turn the crop elevated by the lower conveyor into the second pick up unit so that this unit can feed the crop to the upper conveyor. This conveyor then carries the crop into the truck body.

The invention is embodied in a machine which consists of a main frame supported above the ground by an adjustable hitch attached to some pulling device and two traction type wheels. A crop pick up unit is located beneath the front end of the frame just behind the hitch and consists of a hollow, rotating drum having projecting fingers which pick up the crop and lift it onto the lower conveyor. These fingers recede as they approach the rear of the drum and therefore, do not strike the bottom belt roller.

The conveyor carries the crop upwardly and rearwardly to a point where an upper pick up unit picks up the vines bunched near it by the deflecting apron and elevates them to the upper conveyor which carries the crop forwardly and upwardly, dropping it down into the body of the pulling device. The height of the forward end of this upper conveyor can be readily adjusted to any desired height in order to accommodate various sized pulling and hauling devices. The elevating device is spring balanced for ease of operation. The pivoted lower conveyor is attached to the lower pick up unit which unit is spring balanced so that it readily follows the contour of the soil.

The deflecting apron is connected to the upper end of the lower conveyor and means are provided for the space between the conveyor and the circular path of the upper pick up unit fingers. This is necessary because the volume of crops differs with the kind of crop and various growing conditions. Chain drives operate the two conveyors, apron and pick up units. These drives are provided with releasing clutch means to enable the operator to move the device without a continuous operation of the conveyors, apron and pick up units.

The nature and advantages of my invention will appear more fully from the following description and the accompanying drawings wherein a preferred embodiment of the invention is shown. The drawings and description are illustrative only and are not intended to limit the invention except insofar as it is limited by the claims.

Figure 1:
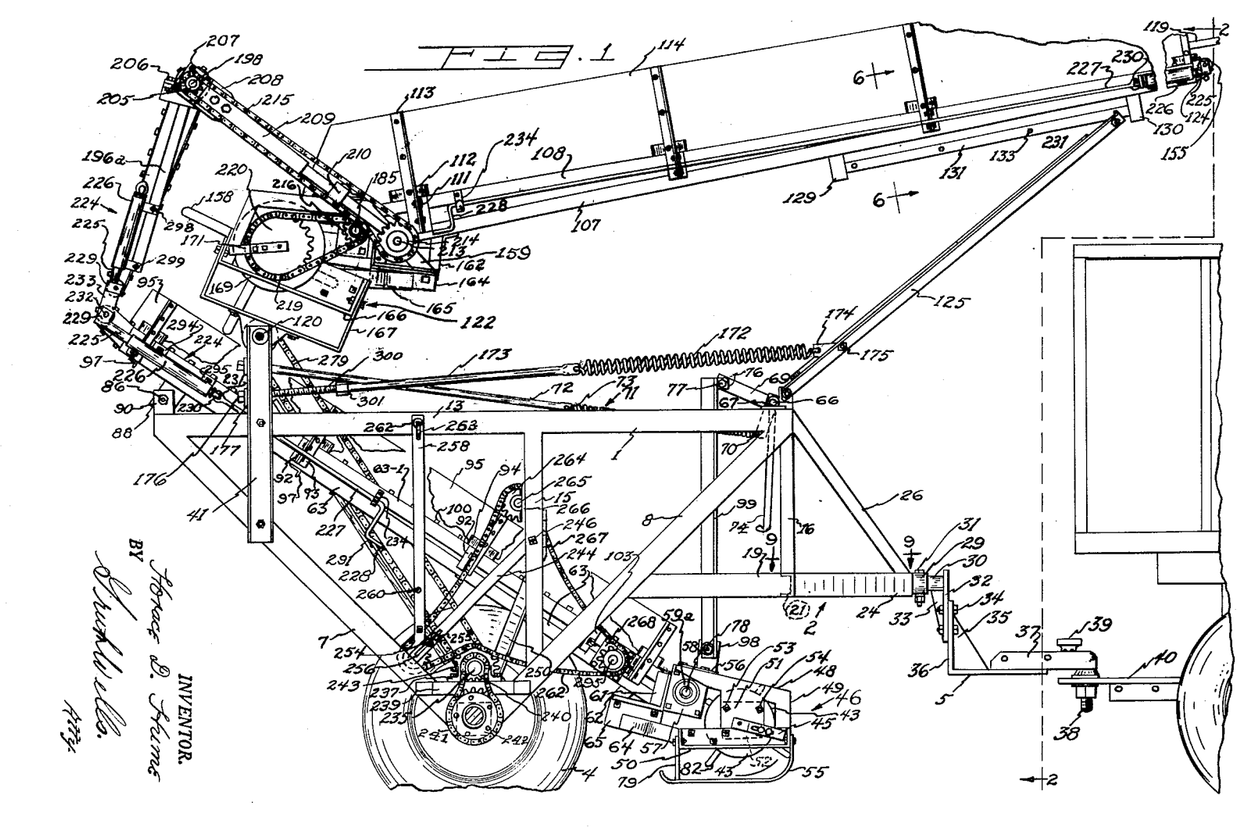
Figure 1 is a side view of the trailer type crop loader connected to a pulling and hauling device.

Referring now to the drawings, the trailer type crop loader is shown in Figure 1 as comprising the rigid main framework 1 and the rigid smaller framework 2 which is fixed to the forward end of the main frame 1. This framework remains substantially horizontal during operation. Supporting the framework at three points are the two wheels 3 and 4 and the hitch 5 which is adapted to be secured to a framework on the towing device (partially shown).

The framework 1 comprises a large, angle iron crossbeam 6 (Fig. 3) having hollow boxed-in end members 11 and 12 to which are welded channel irons 7 and 8, and 9 and 10 respectively to form two V-shaped sides. The legs of the V-shaped side frames are spanned by the two longitudinal beams 13 and 14, and supporting these beams are vertical braces 15 and 16 on one side and 17 and 18 on the other. Two short channel irons 19 and 20 are welded horizontally to the channels 8 and 10 respectively and are joined at their respective ends by a crossbeam 21. Crossbeams 22 and 23 join the ends of the longitudinal beams 13 and 14. Protruding from the forward end of the main frame 1 is frame 2 which is comprised of two horizontal channels 24 and 25 which come together at a point forwardly removed from the main frame 1. A brace 26 extends from the center of crossbeam 22 to the junction of beams 24 and 25. The crossbeam 21 joins the lower ends of uprights 16 and 18 and a vertical brace 28. Bracing the rear of the main frame are two cross braces 80 and 81.

At the intersection of crossbeam 21 and vertical brace 28, the end of a pipe section 29 is welded and extends through the intersection of channels 24, 25 and 26. Into the forward end of a pipe 29 is telescoped a pipe 30 which is part of the hitch 5 and is secured therein by a bolt 31. Welded to and extending downwardly from the forward end of the pipe 30 is a plate 32 which is strengthened by a gusset plate 33. Four bolts 34 secure the plate 32 to an L-shaped plate 36 which is strengthened by a gusset plate 35. A channel section 37 is bolted to the horizontal leg of plate 36 and a bolt 38 is welded into the end of channel section 37 so as to fit into an aperture on the towing vehicle frame 40. A knob 39 is fixed to the channel 37 for adjusting the ball and socket joint on the forward end of the hitch.

On either side of the rear end of the main frame 1 are bolted supporting posts 41 and 42 which support the pivot shaft for the upper pick up unit and attached conveyor.

The lower crop pick up unit is composed of a hollow sheet metal drum 43 and pick-up fingers 82 protruding through slots 83 in the drum. Supporting this drum is the axle 44 which is fixed to an adjusting bar 45 which also absorbs the end thrust of the axle 44 and keeps it in line with respect to the crop pick up side frames 46 and 47. Welded together to form one of these frames are angle irons 48—50 inclusive and a plate 51. Between plate 51 and the drum 43 is a drum shaft bearing plate 52 which is bolted to plate 51 by bolts 53 and 54. A runner 55 is bolted to the bottom of each pick up unit side frame and is supported by a vertical brace 79. The runner provides a soil contact means for the spring balanced pick up unit to rest on. This runner slides along the ground and follows the soil contour, whereby the crops are efficiently recovered from the field. Thus waste, which would otherwise occur due to low lying spots and rises, is prevented. Bolted to the top angle iron 48 of the frame is a plate member 56 to which a bearing plate 57 is bolted. A shaft 58 of the end roller 59 of a lower conveyor 60 rotates in a bearing 59a on the plate 57 (Figure 1).

The lower end of the conveyor 60 is attached to the lower pick up unit by angle irons 61 and 62 which are fixed to the conveyor frame 63. A bracing bar 64 has one end welded to plate 65 which is bolted to the conveyor frame 63, and the other end is bolted to the angle iron 50 on the pick up frame.

Figure 8:
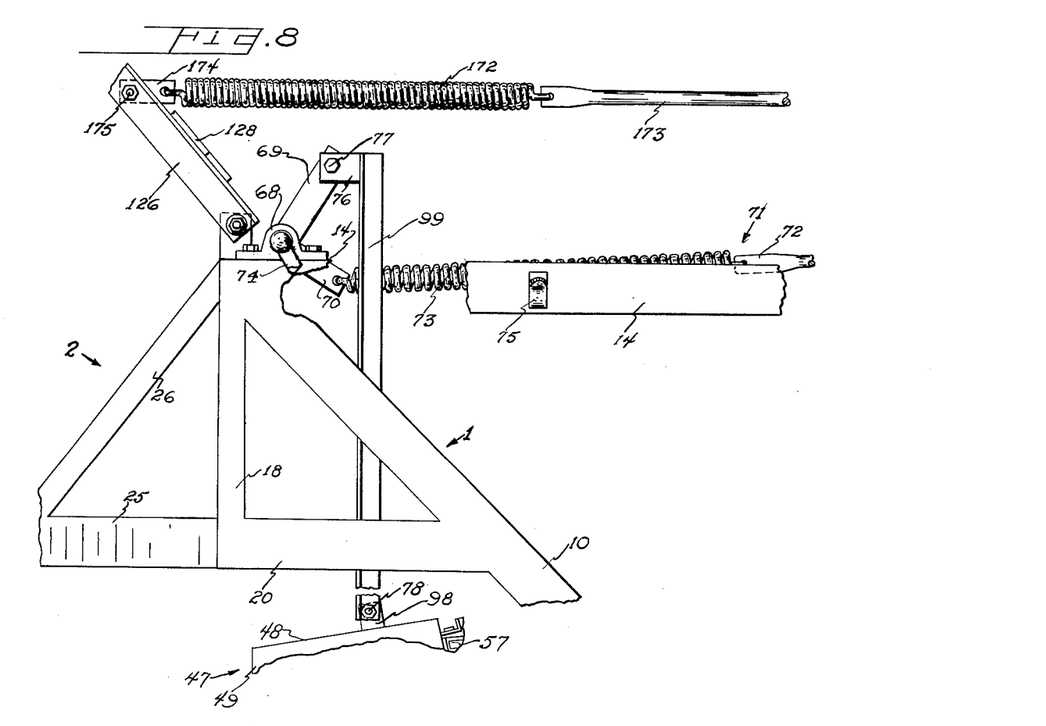
Figure 8 is a fragmentary side view of the bell crank spring balancing system for the lower pick up unit taken on the line 8—8 of Figure 2.
Figure 9:
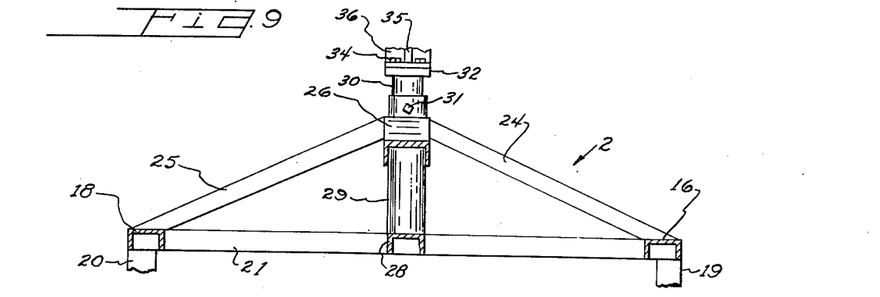
Figure 9 is a sectional view on the line 9—9 of Figure 1.

A lug 98 is provided on the member 56 and to this is pivotally attached an angle iron link 99 by a bolt 78. A bell crank is fixed to a shaft 66, which is mounted in bearings 67 and 68 on frame members 13 and 14. As best seen in Figure 8, the bell crank comprises a bar 69 fixed to shaft 66 at one end and pivotally attached to a horizontal bar 76 at the other end by a bolt 77. The bar 76 is welded to the top of lift link 99 and extends toward the shaft 66. A bar 70 is welded to shaft 66 a short distance from and at approximately right angles to the bar 69 and extends downwardly to a pivotal connection with the spring expansible link 71 which is made up of a rod 72 and a spring 73. This link is bolted to the support post 41. This spring balance system gives a "floating" operative characteristic to the lower pick up unit so that runners 55 of the unit are constantly in contact with the soil during operation. When runner 55 sinks into a depression in the soil, the bell crank system moves downwardly against the pressure of spring 73. This spring pressure aids in pulling up the pick up unit when runner 55 strikes higher soil. Gravity keeps runner 55 down against the earth. A control rod 74 is attached to one end of the shaft 66 and when turned upwardly, it hooks on a hook 75 on the frame member 14. This lifts the pick up unit and conveyor a safe distance off the ground for the purpose of traveling to and from the fields, across roads etc.

Frames 46 and 47 are similar, but are designed to function at opposite ends of the drum 43. The part members of frame 47 correspond to those of frame 46. In actual operation the crops are pulled upwardly to the lowest part of the lower conveyor by means of fingers 82 which protrude from slots 83 in the pick up drum 43. These fingers are spaced longitudinally and circumferentially on an offset shaft (not shown). The offset shaft rotates inside the front portion of drum 43 which also rotates. The offset shaft causes the fingers to project their full length from the lower forward quarter of the drum and but a small fraction of their length in the upper rear quarter of the drum. This allows roller 59 to be placed close enough to the drum 43 to prevent any crops from falling to the ground between the drum and the conveyor. A belt or draper 60 forms the lower conveyor. Wood slats 100 are attached crosswise of the belt 60 at regularly spaced intervals. These slats are used on crop handling conveyors to keep the cut material moving with the belt.

The lower conveyor frame comprises two side frames which are made up of angle irons 63 and 63-1, and 84 and 84-1 respectively, which, at their lower ends, are welded to angle irons 61 on the frames of the crop lifting unit. The upper ends of the angle irons 63 and 84 are welded to the angle irons 63-1 and 84-1 respectively, as shown at 85 in Figure 3. Brackets 88 and 89 are welded to the conveyor side frames below the upper ends and bolts 86 and 87 pivotally connect the brackets 88 and 89 to brackets 90 and 91 which are welded to the rear cross frame member 23. The conveyor side frames are strengthened by cross-ties 92 which are welded to the outside of the conveyor side frames at spaced intervals and also provide a means of fastening uprights 93 to the sides of the conveyor. These uprights have a small curved shield 94 welded to them near the bottom to guide the moving conveyor belt 60 and to support the metal shield 95. The shield 95 is bolted to the uprights 93 along the travel distance of the conveyor belt 60. For additional strength, cross braces 97 connect the side frames. Also, diagonal rod braces 101 and 102 extend from brackets 103 and 104 on the sides of the forward end of the conveyor to its rear corners. Two thin metal strips 105 and 106 extend the length of the conveyor and lie on top and bottom of the frame to provide a support for the conveyor belt 60 to ride on. This structure can best be seen in Figures 3, 4 and 5.

Figure 2:
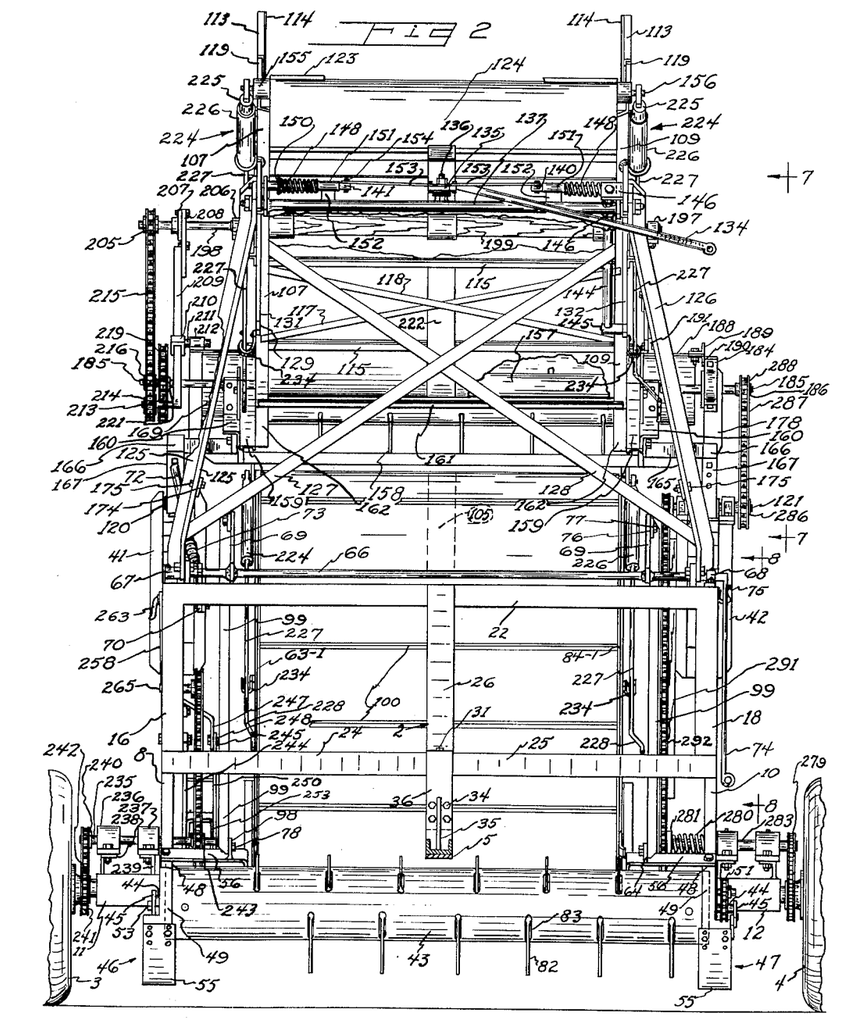
Figure 2 is a front view of the crop loader.
Figure 6:
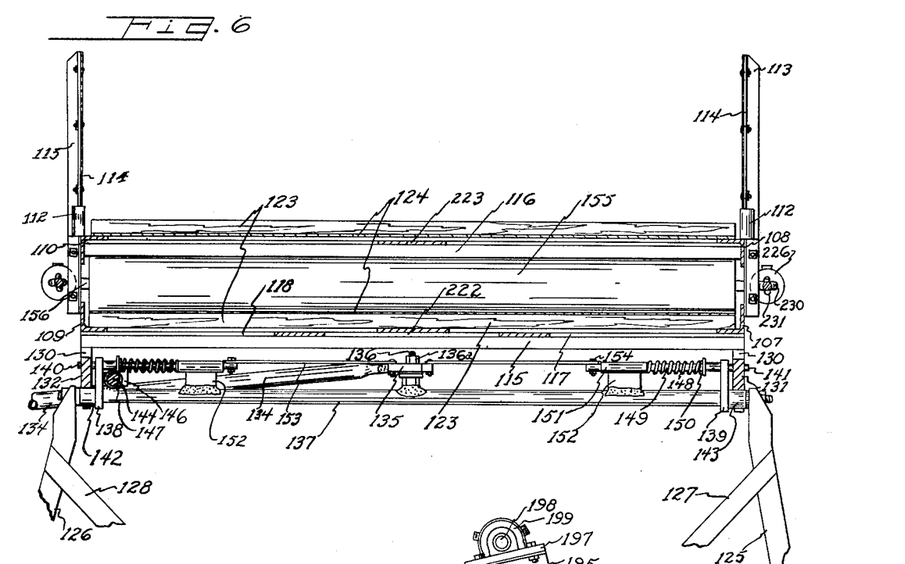
Figure 6 is a sectional view taken on the line 6—6 of Figure 1.

The upper conveyor is constructed similarly to the lower conveyor. It is rigidly attached at its lower rearward end to the upper pick up unit 122 which is pivoted on shafts 120 and 121 borne by the supporting posts 41 and 42 bolted to the main frame. The side frames are made up by two pairs of spaced apart angle irons 107 and 108, and 109 and 110 respectively. To these are welded brackets 111 which support uprights 113 that carry the guide plates 112. The uprights 113 are bolted to the brackets 111 and side shields 114 are bolted to the uprights 113 as seen in Figures 1 and 6. The purpose of these side shields is to keep the crop material confined to the upper conveyor belt 124. Upper and lower cross braces 115 strengthen the conveyor framework as do diagonal braces 117 and 118 welded to the lower sides of angle irons 107 and 109 between spaced cross braces 115, as seen in Figures 2 and 6. Braces 119 project from the uppermost uprights 113 and serve to add rigidity to the extended ends of shield 114. Figure 6 shows slats 123 attached to the belt 124 of the upper conveyor. As seen in Figures 2 and 6, two longitudinal flat guide strips 222 and 223 are welded to the conveyor cross braces 115 to support the conveyor belt.

In order to provide for raising and lowering the upper conveyor angularly about the pivot shafts 120 and 121, supporting bars 125 and 126, braced by bars 127 and 128 as seen in Figures 1, 2, 3, 6 and 8, support the front end of the conveyor by means of an adjustable device shown best in Figures 1 and 6. Rear brackets 129 and forward brackets 130 are welded to the lower side frame members 107 and 109 at the forward end of the conveyor. These brackets support two bars 131 and 132 having a series of apertures 133 along their length. As best seen in Figure 6, a control bar 134 operates to rotate a rectangular plate 135 and its pivot bolt 136 which is welded to a rod 137. A nut 136a holds the plate 135 in place. The rod 137 is mounted between the ends of conveyor supporting bars 125 and 126 and bolted thereto. Brackets 138 and 139 are welded to the rod 137 near its ends and provide bearings for two spring pressed pins 140 and 141 which are adapted to enter the apertures 133 in bars 131 and 132 to hold the conveyor in different inclined positions depending upon the height that is desired for the forward end thereof. Rollers 142 and 143 are journalled on the rod 137 in position to bear against and roll on the undersides of bars 131 and 132. Adjacent to the bar 132, a guide rod 144 is mounted by lugs 145 and 146 on the brackets 129 and 130. The rod 144 extends parallel to the bar 132. A short tubular bearing member 147 is welded to shaft 137 and is so positioned that the rod 144 slides through the member 147 when relative movement occurs between the conveyor and the supporting bars 125 and 126.

The pins 140 and 141 are forced into their apertures by springs 148 wrapped about the pins between a stop 150 on each pin and a bearing tube 151 mounted on the shaft 137 by a bracket 152. A bolt 154 through the end of each pin 140—141, which projects from the tube 151, pivotally attaches the pin to a link 153 which is pivotally attached at its other end to a corner of plate 135. The links 153 are attached to diagonally opposite corners of the plate 135. To change the height of the upper conveyor, the operator merely pulls the bar 134 forward, thereby pulling both pins 140 and 141 from the apertures in the respective bar members 131 and 132. Moving the bars 125 and 126 forward under the conveyor causes the conveyor to fall. Since the pins 140 and 141 are under spring pressure, they will enter the paired apertures in bars 131 and 132 when opposite them, providing the control bar 134 is released so that the springs 148 can exert their pressure on the pins.

As seen best in Figures 1, 2, 3 and 8, a pair of spring expansible links comprising springs 172, rods 173, and short links 174 are connected to the vertically inclined support bars 125 and 126 by bolts 175. These links exert enough force to prevent forward movement of the support bars by mere weight of the upper conveyor alone. The upper conveyor is so balanced by the springs 172 that when the holding pins 140 and 141 are released, the conveyor will automatically rise. It can be lowered by sufficient forward pull on the bar 134. Adjustment of the tension on the springs 172 is provided by the threaded bolt 300 threaded into each rod 173 at 301. The bolts 300 have heads 176 secured by braces 177 that are provided on the uprights 41 and 42.

Figure 7:
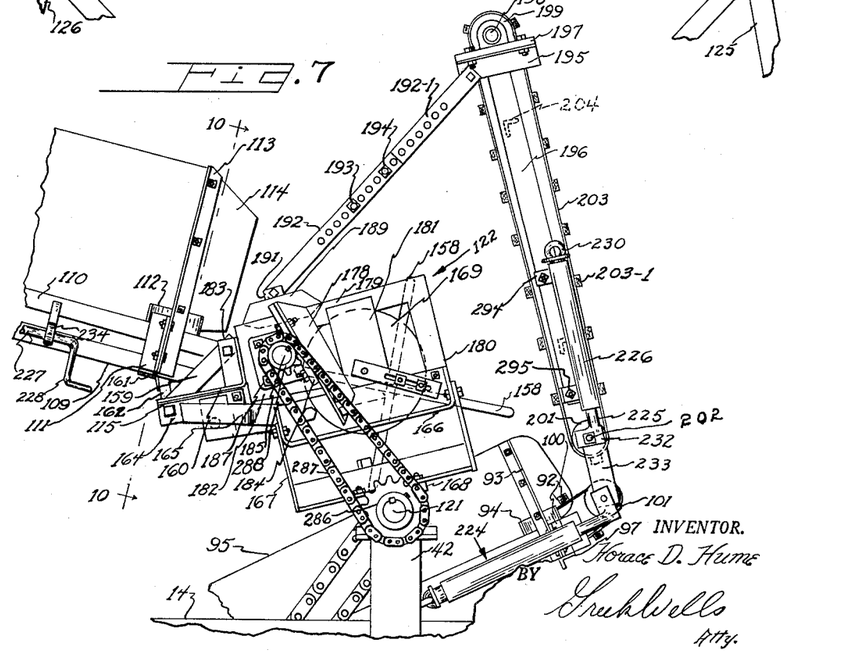
Figure 7 is a fragmentary side view of the connecting conveyor and upper pick up unit drive taken on the line 7—7 of Figure 2.

At the upper end of the upper conveyor is a roller 155 rotating about a shaft 156. A similar roller 157 is positioned at the lower end of the upper conveyor near the upper pick up unit 122. When crops are carried up by the upper pick up unit fingers 158, as seen in Figure 7, the upper conveyor belt 124, having numerous cross bars 123, carries them upwardly to the end of the conveyor, from which they drop to the body of the hauling vehicle.

The construction and operation of the upper pick up unit 122 is similar to that of the lower unit. The angle iron side frames 107—108 and 109—110 of the conveyor are attached to channel irons 159 (see Figures 7, 10 and 12). Brackets 162 are welded to the underside of the conveyor side frame members 107 and 109 and are bolted to the sloping channel irons 159.

Figure 10:
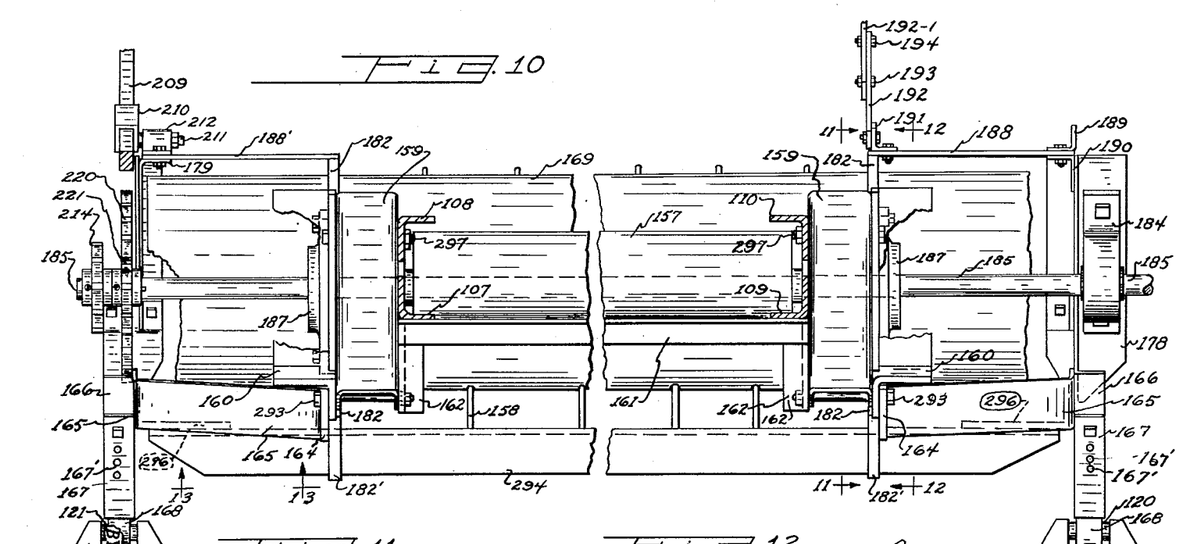
Figure 10 is a sectional view taken on the line 10—10 of Figure 7.
Figure 11:
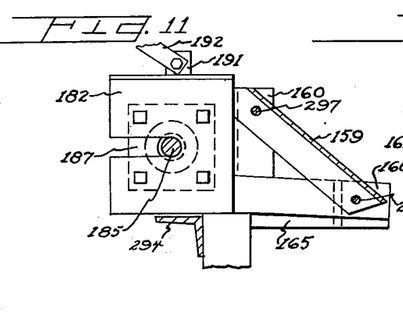
Figure 11 is a sectional view taken on the line 11—11 of Figure 10.
Figures 12, 13:
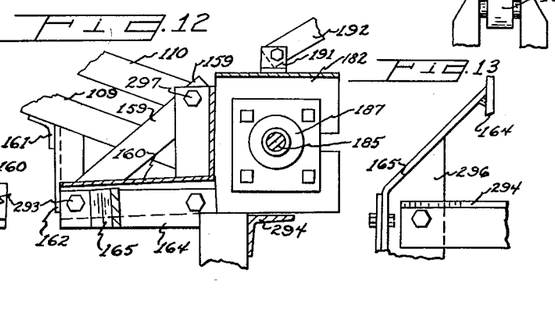
Figure 12 is a sectional view taken on the line 12—12 of Figure 10.
Figure 13 is a partial bottom view of Figure 10 taken on the line 13—13 in Figure 10.

An L-shaped member 160 (made of two angle irons welded together) is bolted to each channel iron 159. A cross bar 161 connects the upper ends of the brackets 162. A brace 164 is also bolted to the lower flange of member 160 and to this is welded brace 165 extending outwardly to an outer frame member 166. As seen best in Figures 10, 11 and 12, a bolt 293 holds the bracket 162 and brace plate 164 tightly against the respective lower side portions of channel iron 159. Also the lower vertical flange of part 160 is held between parts 164 and channel 159 by bolt 293. A bolt 297 secures the upper conveyor frame member 110 to channel 159. The bracket 162 is welded to member 109 and crossbar 161 is welded to both to give a firm connection between the upper conveyor frame and the upper pick up unit. Each member 166 is adjustable in a U-shaped frame member 167 which is supported on the pivot 120 or 121 by a bearing box 168. A pick up drum 169 similar in all respects to the drum 43 rotates about its shaft 170 and contains pick up fingers 158 which operate in a manner similar to the fingers 82 of the lower pick up unit. As is seen in Figures 10 and 13, an angle iron brace 294 extends beneath the upper crop pick up unit for added rigidity and is bolted at its ends to gusset plates 296 which are welded to the braces 165. Bolt holes 167' permit lowering of 166 in 167.

The pick up unit shaft 170 is supported for rotation in an upper framework made from three angle irons 178, 179 and 180. The angle irons 178 and 180 are bolted to the member 166. A plate 181 is welded to the angle iron 179 and extends downwardly to form an end support for the pick up drum shaft 170.

As best seen in Figures 2, 7, 10 and 12, part 178 mounts a bearing block 184 for a shaft 185 of the roller 157. The shaft 185 is supported at the conveyor frame by a second bearing 187 on a plate 182 that is welded to the L-shaped member 160.

Figure 3:
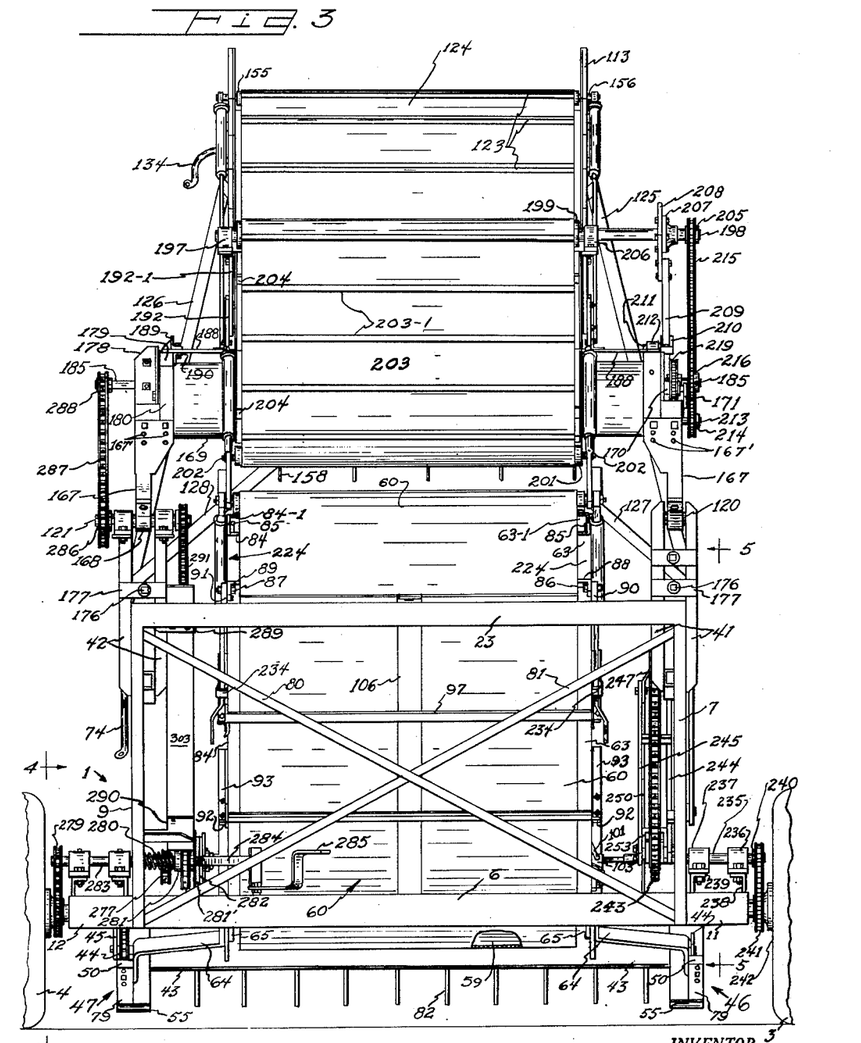
Figure 3 is a rear view of the crop loader.

As best seen in Figures 2 and 3, plate 188 extends inwardly from the top angle iron 179 to the plate 182 to provide a top connection from the upper conveyor frame mounting to the angle iron 179. On the left hand side of Figure 3 angle iron braces 189 and 190 are bolted through plate 188 and welded to angle irons 178 and 179. Blocks 182' are lower extensions of plates 182 and form a brace for brace 294.

A bracket 191 is welded to the top of plate 188 adjacent the conveyor side frame and to this bracket is pivotally mounted an adjustable supporting bar 192 for the deflecting apron positioned behind the upper pick up unit. A member 192-1 provides for extension of bar 192 and both contain a series of apertures for bolts 193 and 194. The upper end of member 192-1 is pivotally mounted on a bracket 195 which is welded horizontally to a vertical side frame member 196 for the deflecting apron. A bearing block 197 is bolted to the bracket 195 and mounts an upper roller shaft 198 which carries a roller 199. At the lower end of the frame member 196 a lower roller 201 is mounted on a shaft 202. A deflecting apron belt 203 having slats 203-1 travels about the two rollers 199 and 201 to carry crops upwardly when they are brought up by the lower conveyor belt 60 to deflect them against the fingers 158. The fingers 158 of the upper pick up unit move the crops over until they fall on the upper conveyor belt 124. Cross braces 204 connect the deflecting apron frame 196 to a like frame 196a at the opposite side edge of the deflecting apron.

As best seen in Figures 1 and 3, the end of the shaft 198 extends out beyond the frame 196a and at that point mounts a sprocket 205. Between the sprocket 205 and the second bearing block 206 mounted on the apron side frame 196a is a bearing block 207 bolted to a plate 208. A lower, narrowed end of this plate is bolted to a long bar 209 extending downwardly through a guide block 210 which is fixed on a small shaft 211. A bearing member 212 mounts the shaft 211 on the plate 188.

As best seen in Figure 2, the lower end of bar 209 carries a shaft 213 extending outward therefrom at a right angle. A sprocket 214 is mounted on the outer end of this shaft and carries a sprocket chain 215 which is extended over the sprocket 205 on shaft 198. The lower side of this chain rides on a sprocket 216 which is mounted on the outer end of the shaft 185 upon which is mounted the lower roller 157 of the upper conveyor. A sprocket chain 219 is wrapped about a large sprocket 220 which is attached to the end of the pick up unit drum shaft. This chain also extends about a sprocket 221 mounted on shaft 185 between the pick up unit frame and the outer sprocket 216, as best seen in Figure 10. Thus it will be seen that the deflecting apron can be angularly adjusted by adjusting the length of the rod 192. The bar 209 slides in member 210 and therefore the distance between sprockets 205 and 214 remains constant. The chain 215 is driven by the sprocket 216 on the rotating roller shaft 185 and this drive is not disturbed by any angular positioning of the deflecting apron because the lower side of chain 215 merely rolls back and forth on the sprocket 216.

Part 224 is a device which is claimed in my prior Patent No. 2,480,294 for varying the distance between the conveyor belt rollers by moving a sleeve 225 that carries a bearing block 229 for a roller in or out of the tube 226 by rotating a rod 227 which is operated by a handle 228. The rod is attached to an eye 230 that operates a screw arrangement in the tube 226 so that when the rod is turned, the shaft 225 moves in or out of tube 226, depending on the way handle 228 is rotated. The cylinders 226 are fastened to the side frames by means of brackets such as 298 and 299 in Figure 1, which are bolted to the frame members. Thus the conveyor belts can be loosened if they grow damp and contract. This adjustment is necessary in order to save equipment from breakage due to rain or wet crops. Canvas is the generally used material for these conveyor belts and has a well known tendency to contract when wet.

The expansible unit 224 is found on both side frames of the lower conveyor at its upper end. A pair of expansible units are also found on the lower part of the deflecting conveyor framework. They extend downwardly and a bar 233 is mounted at its ends on the two blocks 229 of the expansible units of the deflecting apron and the lower conveyor respectively. Similarly, expansible devices 224 are mounted on the upper end of the upper conveyor. Clips 234 are provided on the conveyor side frames to hold the handles 227 when not in use.

Figure 5:
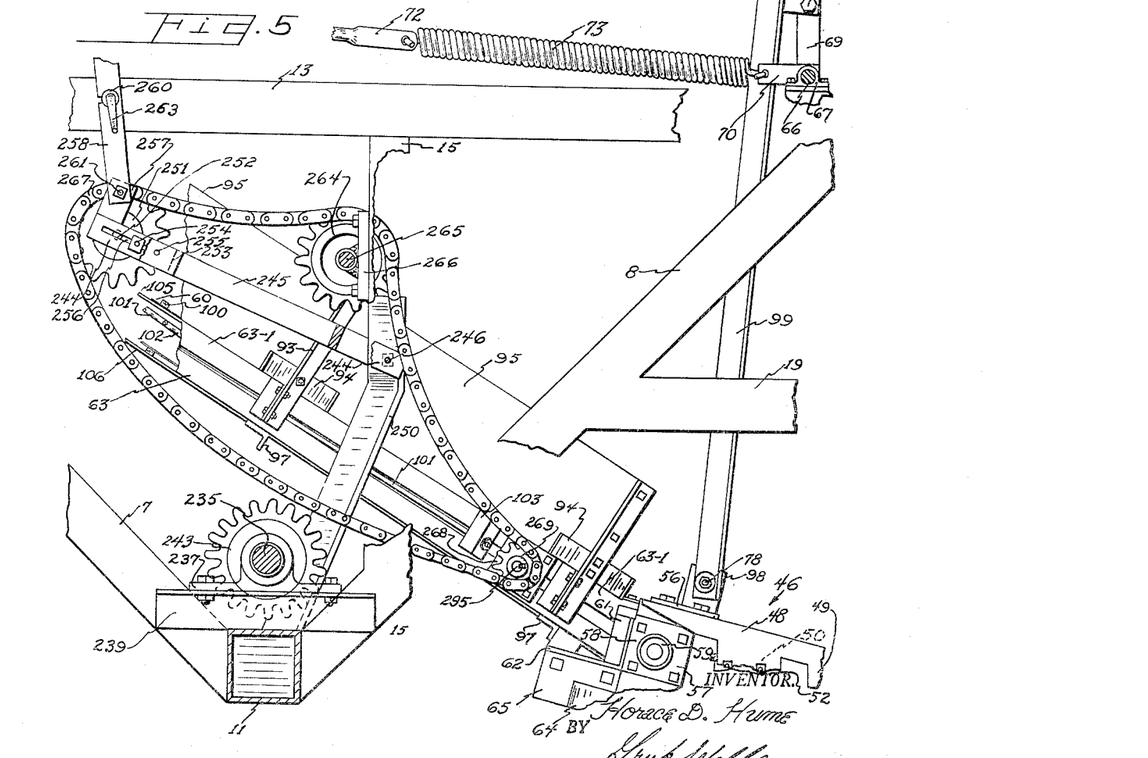
Figure 5 is a fragmentary sectional view taken on the line 5—5 of Figure 3.

The pulling of the crop loader by the pulling and hauling device causes a rotation of the traction type wheels 3 and 4. Figures 1, 2, 3 and 5 show how wheel 3 drives a countershaft 235 which is mounted on the frame member 11 by two bearing blocks 236 and 237 bolted to angle irons 238 and 239 welded to the top of frame member 11. A sprocket 240 is keyed to the end of countershaft 235 nearest the wheel and is driven by a roller chain 241 which is wrapped about a large sprocket 242 on the wheel hub. The countershaft 235 extends inside the main frame 1 for a substantial distance and parallel to the cross beam 6, as seen in Figure 2. A sprocket 243 is keyed to the countershaft near its inner end, as best seen in Figure 5. Two bar members 244 and 245 form a frame which is suspended from the vertical main frame member 15 by a bolt 246 through bar 244 and by a bracing member 247 which is bolted at its lower end to the bar 245 and at its upper end to the frame 15, as seen in Figure 3. The brace 247 is also extended as shown at 250, down to the cross beam 6 to which it is welded. The bars 244—245 mount a sprocket 251 at their free ends by means of a shaft 252 which is mounted in yoke members 253 having bolts 254 and 255 that slide in a slot 256. Nuts on these bolts are tightened to fix shaft 252 in one position. Attached to the end of bar 244 is a bracket 257. Attached to the bracket 257 by a bolt 261 is a bar 258 having two apertures 260 and 262 into one of which fits a handle member 263 which can be inserted and tightened in either of the apertures 260 or 262 to hold the bar 258 in an up or down position. Roller chain 267 connects sprockets 251, 264 and 269. This chain also lays on and is driven by sprocket 243 when bar 258 is in the "down" position.

A sprocket 264 is mounted on the inner end of a stub shaft 265 welded at one end to block 266 which is bolted to the side of the main frame member 15 nearest the adjusting bar 258.

Figure 4:
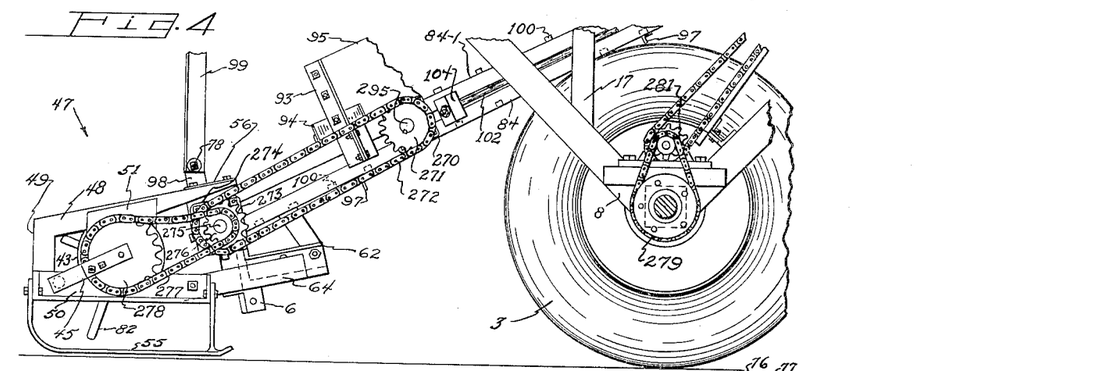
Figure 4 is a fragmentary side view showing the side of the lower pick up unit and the lower end of the conveyor, and part of the lower pick up unit drive from the wheel.

Near the lower end of the conveyor is a shaft 295 mounted in a bearing block 268 on the side of the conveyor nearest the above described roller chain. Attached to the end of the shaft is a sprocket 269 which engages roller chain 267. This shaft is driven in a counterclockwise direction when the bar 258 is in a down position so that chain 267 is engaged with sprocket 243. When bar 258 is in an up position the chain is lifted off sprocket 243 and is suspended by sprockets 251 and 264. This device serves as a clutch for the lower crop pick up unit which is driven by shaft 295 when the chain 267 is in engagement with all four sprockets 269, 264, 251 and 243. On the opposite end of shaft 295 is a bearing plate 270 supporting shaft 295. As best seen in Figures 2, 3 and 4, a chain 272 is driven by sprocket 271 mounted on shaft 295 and drives sprocket 273 which is mounted on an extension 275 of the shaft 58 that is held in place by a bearing plate 274 bolted to the lower side frame of the lower conveyor. A sprocket 276 is keyed to the extension shaft 275 and, in turn, drives roller chain 277 which causes the crop pick up drum shaft 44 to rotate by engaging large sprocket 278 keyed to the end of the drum shaft 44.

As best seen in Figures 2, 3 and 4, wheel 4 drives roller chain 279 which drives shaft 283. A spring 280 exerts a pressure against a sprocket 281, and on the opposite side of the sprocket 281 is a clutch consisting of a flanged wheel 282 which is fixed to the end of shaft 283 and a member 281' of the sprocket. Figure 3 shows a bar 284 against the member 281'. When the handle 285 is pushed toward the front end of the loader, the end of bar 284 presses the member 281' away from wheel 282 and against the spring 280. This releases the clutching mechanism thereby causing the sprocket 281 to stand still while the shaft 283 rotates within it. Sprocket 281 drives a chain 291.

Chain 291 drives shaft 121 which is mounted on supporting post 42. Sprocket 286 is mounted on the outer end of the shaft 121 and engages roller chain 287 which in turn engages sprocket 288 on shaft 185 and drives the upper conveyor's lower roller 157. On the opposite side of the loader frame, the sprockets 214 and 221 are keyed to and turn with shaft 185. Sprocket 214 engages roller chain 215 and drives the upper roller 199 of the deflecting apron through sprocket 205. The smaller sprocket 221 is keyed to shaft 185 inside of sprocket 214 and drives roller chain 219 which drives the larger sprocket 220 of the upper crop pick up unit.

Supported by a bracket 289 which is welded to main frame member 14 and a bracket 290 which is welded to frame member 9 is a tubular chain guard 363 which protects the chain 291.

Having thus described my invention, I claim:

1. In a trailer type crop loader of the character described, a frame, wheels supporting said frame above the ground, a swivel towing hitch mounted at the lower forward portion of said frame, a lower conveyor pivotally mounted on the upper rear portion of said frame, a lower crop pick up unit fixed to the lower forward end of said lower conveyor and adapted to ride on the ground, spring supporting and balancing means for the forward end of said lower conveyor, a deflecting apron pivotally mounted at the rear of said lower conveyor and extending upwardly therefrom, supporting posts extending upwardly from the upper rear portion of said frame, an upper crop pick up unit pivotally mounted on the top of said supporting posts, support means extending from said upper crop pick up unit to said deflecting apron, an upper conveyor fixed to said upper crop pick up unit and extending upwardly and forwardly therefrom directly above said lower conveyor and projecting forwardly beyond the lower conveyor, spring supporting and balancing means for said upper conveyor pivotally attached to the upper forward portion of said frame, means to raise and lower the forward end of said upper conveyor, driving means from one wheel to said lower crop pick up unit and said lower crop conveyor and having a clutch means interconnected therein, driving means from a second wheel to said upper crop pick up unit and said upper conveyor, a clutch means in said last named driving means, driving means connected between said drive for said upper conveyor and said deflecting apron, and means for confining the crop to the limits of said conveyors.

2. In a trailer type crop loader of the character described, a frame, wheels supporting said frame above the ground, a swivel towing hitch mounted at the lower forward portion of said frame, a lower conveyor pivotally mounted on the upper rear portion of said frame, a lower crop pick up unit fixed to the lower forward end of said lower conveyor and adapted to ride on the ground, spring supporting and balancing means for the forward end of said lower conveyor, a deflecting apron pivotally mounted at the rear of said lower conveyor and extending upwardly therefrom, supporting posts extending upwardly from the upper rear portion of said frame, an upper crop pick up unit pivotally mounted on the top of said supporting posts, support means extending from said upper crop pick up unit to said deflecting apron, an upper conveyor fixed to said upper crop pick up unit and extending upwardly and forwardly therefrom directly above said lower conveyor and projecting forwardly beyond the lower conveyor, spring supporting and balancing means for said upper conveyor pivotally attached to the upper forward portion of said frame, and means to raise and lower the forward end of said upper conveyor.

3. In a crop loader, a frame, two rear wheels supporting the frame, a towing hitch at the front of the frame, a crop elevating conveyor having its rear end pivoted on the upper rear portion of the frame, a crop pick-up unit at the forward end of the conveyor, and drive means for said conveyor and pick-up unit comprising a sprocket wheel driven by one of said wheels, a sprocket wheel on the conveyor operatively connected to the conveyor and pick-up unit, a sprocket wheel on the frame, an arm pivoted on the frame and carrying a sprocket wheel at its free end and adapted to swing over the first named sprocket wheel, a sprocket chain around the three last named sprocket wheels, and means to move the arm up and down between a position forcing the chain into engagement with the first named sprocket wheel and a position holding the chain spaced from said first named sprocket wheel.

HORACE D. HUME.

References Cited in the file of this patent
UNITED STATES PATENTS

| Number | Name | Date |
| --- | --- | --- |
| 490,171 | M. J. Spencer | Jan. 17, 1893 |
| 605,025 | J. W. Spencer | May 31, 1898 |
| 1,709,094 | Orge | Apr. 16, 1929 |
| 1,841,729 | Hauge | Jan. 19 1932 |
| 1,891,908 | Bernotow | Dec. 27, 1932 |
| 2,174,605 | A. T. Spencer, Jr. | Oct. 3 1939 |
| 2,516,192 | Ensinger | July 25, 1950 |
| 2,542,446 | Abel et al. | Feb. 20, 1951 |
| 2,551,427 | Ellefson | May 1, 1951 |